Patented Oct. 14, 1941

2,258,718

UNITED STATES PATENT OFFICE 2,258,718

ESTERS OF ORTHO INORGANIC ACIDS OF TITANIUM, TIN, AND ALUMINUM WITH ALPHA BETA UNSATURATED PRIMARY ALCOHOLS

Henry S. Rothrock, Wilmington, Del., assignor to E. I. du Pont de Nemours & Company, Wilmington, Del., a corporation of Delaware No Drawing. Application August 24, 1939, Serial No. 291,754

27 Claims. (Cl. 260—80)

This invention relates to esters of unsaturated alcohols with inorganic acids of titanium, aluminum, and tin.

The invention has as an object the preparation of new esters of titanium, aluminum and tin with unsaturated alcohols. A further object is the preparation of polymers of said esters. A still further object is the preparation of novel, plastic, molding, and casting compositions. Another object is the preparation of interpolymers of polymerizable organic compounds of the type hereinafter defined with an ester of titanium, aluminum, or tin with a primary alcohol having an unsaturated linkage between the carbon next to the carbinol carbon and the carbon once removed from the carbinol carbon. A still further object is to provide interpolymers possessing novel, white, enamel-like surfaces resistant to wear. A particular object of the invention is the provision of hard, tough, interpolymeric compositions. Other objects will appear hereinafter.

These objects are accomplished by the following invention which comprises esters of ortho inorganic acids of titanium, tin and aluminum with primary alcohols having an unsaturated linkage between the carbon next to the carbinol carbon and the carbon once removed from the carbinol carbon and preferably primary alcohols having a methylene ($CH_2$) group attached by an open chain unsaturated linkage to a carbon which is in turn attached to the carbinol carbon, polymers of said esters and interpolymers thereof with other polymerizable materials, e. g., polymerizable organic compounds containing a methylene ($CH_2$) group attached by an ethylenic double bond to a carbon atom which is in turn attached to at least one negative group. Negative groups are discussed at length in Henrich, Johnson, and Hahn, Theories of Organic Chemistry, chapter 8 and include RCO—, RCOO—, $NO_2$—, $C_6H_5$—, $C_{10}H_7$—, $C_6H_5O$—, RO, NC—, RNHCO—, $NH_2CO$—, $(RCO)_2N$—, RCONH—, Cl—, $CH_2$=CH—, RCH=CH—, CH=C—, HOOC—CH=CH—, and $CH_2$=CH—O—, R being alkyl, aryl; or aralkyl.

The polymeric compositions of the present invention are characterized in that they contain as a component or constituent or both a polymeric ester of tin, aluminum or titanium with an alpha-beta-unsaturated primary alcohol i. e. an alcohol having an open chain unsaturated linkage between the carbon next to the carbinol carbon and the carbon once removed from the carbinol carbon. These polymeric esters are prepared by polymerization of the monomeric ester either alone or in the presence of polymerizable materials, e. g., polymerizable methylene compounds as above defined.

The monomeric esters may be readily prepared by ester interchange of the unsaturated alcohol with an ester of the ortho inorganic acid with a more volatile alcohol, and the polymers, copolymers, and interpolymers from the corresponding monomers. Other methods for making the monomeric esters may be employed in certain cases as indicated below, e. g., the reaction of unsaturated alcohols with the ortho acids. The monomeric esters may be polymerized by subjecting the compound alone or in admixture with a polymerizable organic compound containing the $CH_2$=C grouping as above defined to conditions effective to cause polymerization, e. g., heat, actinic light, etc., in the presence or absence of polymerization catalysts, solvents, diluents, etc.

The more detailed practice of the present invention is illustrated by the following examples wherein parts given are by weight unless otherwise stated.

Example I

Triallyl aluminate is prepared by heating together 3.5 parts of metallic aluminum, 100 parts of toluene, 100 parts of allyl alcohol and 2 parts of mercuric chloride until reaction ceases. The sludge is filtered off, and the toluene and excess allyl alcohol removed by distillation at room temperature under reduced pressure. The product obtained is a heavy viscous oil soluble in toluene, xylene, etc. On heating at 210° C. for 8 hours triallyl aluminate polymerizes to a stiff gel which is insoluble in such common organic solvents as benzene, toluene, dioxane, etc.

A mixture of 47.5 parts of methyl methacrylate and 2.5 parts of triallyl aluminate, prepared as described above, is heated at 65° C. for 3 days. The product obtained is a virtually colorless solid which is hard, brittle, and unlike unmodified polymeric methyl methacrylate is insoluble in such organic solvents as benzene, toluene, dioxane, etc. On exposure to boiling water the surface of the polymer becomes opaque and can be polished to a clear, white surface.

Example II

Forty-eight parts of triethyl aluminate, 130 parts of methallyl alcohol, and 150 parts of toluene are heated under a fractionating column. After the theoretical amount of ethyl alcohol has been distilled off, excess methallyl alcohol and toluene are removed under reduced pressure. The product is a heavy viscous oil, soluble in toluene, xylene, etc. On heating at 210° C. for 8 hours the trimethallyl aluminate polymerizes to a stiff gel.

A mixture of 45 parts of methyl methacrylate and 5 parts of trimethallyl aluminate, prepared as described above or by the method of Example I, is heated at 65° for 2 days and then at 100° C. for 1 day to complete the polymerization. The product is a hard, brittle, virtually colorless solid which is insoluble in the common organic solvents which dissolve unmodified polymeric methyl methacrylate, e. g., benzene, toluene, dioxane, butyl acetate, etc.

*Example III*

Fifty parts of tetraethyl stannate and 150 parts of methallyl alcohol are refluxed while the calculated amount of ethyl alcohol is removed. The excess methallyl alcohol is removed under reduced pressure leaving a yellow amorphous solid which is insoluble in benzene, toluene, and dioxane.

A mixture of 19.5 parts of methyl methacrylate, 0.5 part of tetramethallyl stannate, prepared as described above, and 0.2 part of benzoyl peroxide is allowed to stand at room temperature for 24 hours and then heated at 65° C. for 3 days. The product obtained is hard, tough, translucent and insoluble in toluene, benzene, dioxane and butyl acetate which are solvents for unmodified polymeric methyl methacrylate. The softening temperature of the product obtained is 118° C.

An interpolymer prepared from 18 parts of methyl methacrylate, 2 parts of tetramethallyl stannate, and 0.2 part of benzoyl peroxide can be given a white enamel-like surface by boiling in water for about 10 hours.

A mixture of 9.5 parts of styrene, 0.5 part of tetramethallyl stannate, and 0.1 part of benzoyl peroxide is heated for 48 hours at 50° C. whereupon a clear, slightly yellow solid softening at 82° C. is obtained. Moldings of this material are clear, light colored and strong.

*Example IV*

One hundred parts of tetraethyl titanate and 230 parts of methallyl alcohol are refluxed together until the theoretical amount of ethyl alcohol has been removed. The residue in the flask is then fractionally distilled collecting the fraction boiling at 172–174° C. at 6 mm. Tetramethallyl titanate in a yield of 85% of the theoretical is thus obtained. This ester does not polymerize when heated alone in the absence or presence of such materials as stannic chloride or boron trifluoride.

Fifty parts of tetramethallyl titanate and 52 parts of vinyl acetate are mixed in the absence of a catalyst. This mixture reacts at room temperature with some generation of heat to give a colored infusible polymer and a volatile ester, (methallyl acetate). The resulting solid is insoluble in the common organic solvents. Vinyl acetate alone does not polymerize on standing at room temperature.

To 20 parts of a 10% toluene solution of polyvinyl acetate is added 1 part of tetramethallyl titanate and the mixture is heated overnight at 65° C. whereupon a thick gel separates. The toluene is then removed by distillation under reduced pressure. The product is an infusible, insoluble, slightly yellow solid. Polyvinyl acetate, similarly prepared, but without addition of the titanate, is soluble in such organic solvents as benzene, toluene, dioxane, ethyl acetate, ethanol, etc.

A mixture of 39 parts of methyl methacrylate, 1 part of tetramethallyl titanate, and 0.4 part of benzoyl peroxide is heated at 65° C. for 24 hours and then at 100° C. for 24 hours longer. The resulting casting is a transparent, slightly yellow, hard solid which is insoluble in toluene, benzene, ethanol, phenols, and other common organic solvents in which polymeric methyl methacrylate is soluble. The interpolymer softens at 107° C.

While the examples illustrate esters of certain readily available alcohols the invention is generic to esters of primary alcohols having an unsaturation between the carbons alpha and beta to the carbinol, e. g., methallyl alcohol, allyl alcohol, furfuryl alcohol, crotonyl alcohol, tiglyl alcohol, allene carbinol, 3-chlorobutene-2-ol-1, hexadiene-2,4-ol-1, 3,7 - dimethyloctadiene - 2,7 - ol - 1, propargyl alcohol, etc. It is preferred, however, that the esters be of aliphatic alcohols having not more than 18 carbon atoms and having at least one multiple and preferably double bond for each 6 carbon atoms. Esters of primary alcohols having a methylene ($CH_2$) group attached by an open chain unsaturated linkage to a carbon which is in turn attached to the carbinol carbon are preferred.

The acid component may be any inorganic ortho acid of titanium, aluminum, or tin. Ortho is used in the sense of the highest hydrated form of the acid oxide. The acids are further of the elements in the oxygen valence stage characteristic of the group, i. e., of the sesquioxide of aluminum and the dioxide of titanium and tin.

As indicated above the esters of this invention may be made by ester interchange of the unsaturated alcohol and an ester of the inorganic ortho acid of titanium, aluminum or tin with a more volatile alcohol.

In general a readily available ester of titanium, aluminum or tin, e. g., triethyl aluminate, tetraethyl titanate, or tetraethyl stannate is employed. The ester is so chosen that the alcohol component is more volatile than the unsaturated alcohol used. The corresponding sodium alcoholate has been found to be a good catalyst for this ester interchange and is introduced by adding a small amount of sodium to the reaction mixture. Other basic catalysts such as calcium oxide, magnesium oxide, etc., may also be used. The usual acidic catalysts for ester interchange reactions cannot be used when the unsaturated alcohol is sensitive to acid. The preparation of the unsaturated ester from the acid chloride, e. g., titanium tetrachloride, is generally unsatisfactory since the alpha-beta-unsaturated primary alcohols are sensitive to the hydrogen chloride formed as a result of the reaction.

The unsaturated primary alcohol esters of aluminum can be polymerized, for example, by exposing them in the presence or absence of a solvent to the action of heat or a source of actinic light.

The monomeric esters may be polymerized alone or in the presence of another polymerizable substance, e. g., a polymerizable organic compound containing the methylene group ($CH_2$) attached by an ethylenic double bond to a carbon atom which is in turn attached to at least one negative group. Any polymerizable organic compound containing the methylene group ($CH_2$) attached by an ethylenic double bond to a carbon atom which is in turn attached to at least one negative group may be used, including vinyl chloride, asymmetrical dichloroethylene, methyl methacrylate, styrene, methyl acrylate, vinyl propionate, vinyl thioacetate, ethyl methacrylate, cyclohexylmethacrylate, cyclohexylphenyl methacrylate, acrylonitrile, methacrylonitrile, methacrylic acid, methacrylic amide, methacrylic anilide, vinyl butyrate, N-alkyl methacrylamide, N-alkylacrylamide, vinyl acrylate, vinyl choloracetate, ethyl acrylate, butyl methacrylate, octyl methacrylate, dodecyl methacrylate, beta-chloroethyl methacrylate, methyl vinyl ketone, ethyl vinyl ether, butyl vinyl ether, etc. Another class of polymerizable materials is that of drying oil acid esters of polyhydric alcohols including drying oils, drying oil modified polyhydric alcohol-polycarboxylic acid resins, drying oil varnishes, etc. Specific materials include oiticica oil, dehydrated castor oil, soya bean oil, linseed oil modified alkyd resins, etc.

The proportion by weight of the monomeric compound of this invention used in the preparation of the interpolymers may be varied within wide limits. For example, addition of 1 to 5% to a polymerizable methylene compound as above defined renders the polymers which are otherwise soluble in toluene insoluble in this solvent. Generally it is preferred that the percentage not exceed 15%. For castings whose surfaces are to be given a white enamel-like finish, from 2 to 5% of the unsaturated ester is sufficient. While the interpolymers containing the unsaturated stannates are preferred as they are of greater advantage in the preparation of white articles, the unsaturated esters of titanium or aluminum may also be used.

In the preparation of articles cast by bulk polymerization of an unsaturated titanate, aluminate, or stannate with another polymerizable substance the amount of unsaturated ester that can be introduced may be varied widely depending upon the result desired. The softening temperature of the interpolymers in general decreases as the proportion of unsaturated ester is increased. Although good castings can be obtained from methyl methacrylate-unsaturated titanate, stannate, or aluminate mixtures in relatively short periods of time without the addition of one of the usual polymerization catalysts a small amount of these catalysts may be added to shorten the polymerization period. The polymerization may be carried out under any of the conditions well known to the art. Polymerization by exposure to actinic light at room temperature or elevated temperature or the use of heat at either atmospheric or superatmospheric pressure may be employed. A granular interpolymer is obtained when the polymerization is carried out with vigorous agitation in a liquid medium which is a non-solvent for the polymer. In such instances and particularly when the non-solvent is a hydrocarbon, it is preferred to carry out the polymerization in the presence of a granulating agent at about the boiling point of the mixture, but the use of a lower or higher temperature is not precluded.

The amount of unsaturated titanate, aluminate, or stannate used with drying oil acid esters of polyhydric alcohols in coating compositions may be varied from about 1 to about 40% on the basis of the solids content of the coating composition.

The selection of the component and the relative amount of each used depends upon the properties desired in the interpolymer. For example, interpolymers of methyl methacrylate containing as low as 1 to 2% of the unsaturated ortho esters of tin and titanium are as hard, tough and high softening as polymethyl methacrylate; they show, however, decreased sensitivity to the common organic solvents such as benzene, toluene, ethyl and butyl acetate, etc. By interpolymerization of suitable proportions of methyl methacrylate and any of the titanate, stannate, and aluminate unsaturated ortho esters herein described, hard, tough castings may be obtained which form glossy, white, enamel-like coatings when heated in the presence of water.

The interpolymerizations may be conducted by several well known methods, for example, the components may be polymerized in bulk without added diluent in a tightly closed vessel having any desired form. This may be accomplished by heating in the temperature range of 60 to 100° C. until a thick liquid is formed and then allowing this to solidify at room temperature to avoid bubble formation, or the whole process may be carried out at room temperature. The products obtained by these methods are usually clear, bubble-free masses having the shape of the container in which they are cast. Polymerization can be effected in the presence of an organic diluent if desired.

In the above described method polymerization may be accelerated by the addition of polymerization catalysts such as benzoyl peroxide. Other polymerization catalysts such as ozone, hydrogen peroxide, perphthalic acid, peracetic acid, dibutyryl peroxide, lauroyl peroxide, succinyl peroxide, and the like function satisfactorily. The catalyst concentration may be varied in the range of 0.1 to 2% but the range of 0.1 to 1% is preferred. Low concentrations of catalysts and lower temperatures (35° to 50° C.) may be used if desired. The time required for the polymerization is largely dependent on the conditions used, the concentration of unsaturated ortho ester, and catalyst and may vary from a few hours to several days.

Interpolymers containing the polymeric unsaturated alcohol aluminates, titanates and stannates of the present invention are useful in the preparation of cast articles and molding powders. They are also used as modifying agents in drying oil and drying oil modified polyhydric alcohol-polycarboxylic acid resin coating compositions. In addition they are capable of surface hydrolysis to give white coatings of exceptional appearance.

The present invention affords new and useful monomeric and polymeric materials having striking properties. The greatest utility of the invention is in the field of interpolymerizations. In this field the present invention affords a novel means of modifying and improving polymers made from polymerizable negatively substituted vinylidene monomers. The kind and concentration of the unsaturated alcohol stannate, titanate or aluminate may be varied to produce the desired modified properties. One or more polymerizable methylene compound monomers may be interpolymerized according to the present invention with one or more of the unsaturated ortho esters of this invention. In contrast to the polymers of straight methylene compound monomers these insolubilized resins which have retained hardness and toughness may be used in contact with organic solvents without being adversely affected. The interpolymers show improvement in craze resistance, provided the concentration of the unsaturated ortho ester is sufficiently high. Resistance to crazing is determined by allowing acetone to evaporate at room temperature from the surface of shaped pieces of the product and examining the surface after evaporation of the acetone. If the surface shows minute regular surface cracks it is said to craze while if free from such cracks it is said to be non-crazing. An organic solvent such as acetone when applied to polymerized methyl methacrylate causes bad crazing but interpolymers containing from 10 to 20% of an unsaturated stannate, titanate, or aluminate of this invention are resistant to this solvent.

The above description and examples are intended to illustrate the invention only and it is to be understood that any modifications of or variations from which conform to the spirit of the invention is intended to be included within the scope of the claims.

I claim:

1. An ester of a primary alcohol having an unsaturated linkage between the carbon next to the carbinol carbon and the carbon once removed from the carbinol carbon with an ortho inorganic acid of an element of the class consisting of aluminum, titanium, and tin.

2. An ester of a primary alcohol having an unsaturated linkage between the carbon next to the carbinol carbon and the carbon once removed from the carbinol carbon with an ortho inorganic acid of aluminum.

3. An ester of a primary alcohol having an unsaturated linkage between the carbon next to the carbinol carbon and the carbon once removed from the carbinol carbon with an ortho inorganic acid of titanium.

4. An ester of a primary alcohol having an unsaturated linkage between the carbon next to the carbinol carbon and the carbon once removed from the carbinol carbon with an ortho inorganic acid of tin.

5. A polymer of a primary alcohol having an unsaturated linkage between the carbon next to the carbinol carbon and the carbon once removed from the carbinol carbon with an ortho inorganic acid of an element of the class consisting of aluminum, titanium, and tin.

6. An interpolymer of an ester of a primary alcohol having an unsaturated linkage between the carbon next to the carbinol carbon and the carbon once removed from the carbinol carbon with an ortho inorganic acid of an element of the class consisting of aluminum, titanium, and tin with another polymerizable, organic compound containing a methylene ($CH_2$) group attached by an ethylenic double bond to a carbon atom which is in turn attached to at least one negative group of the class consisting of $RCO-$, $RCOO-$, $C_{10}H_7-$, $RO-$, $NC-$, $RNHCO-$, $NH_2CO-$, $(RCO)_2N-$, $RCONH-$, $Cl-$, $CH_2=CH-$, $RCH=CH-$, $CH\equiv C-$, $HOOC-CH=CH-$, and $CH_2=CH-O-$ wherein R is selected from the group consisting of alkyl, aryl, and aralkyl radicals.

7. A methallyl ester of an ortho inorganic acid of an element of the class consisting of aluminum, titanium, and tin.

8. A polymer of a methallyl ester of an ortho inorganic acid of an element of the class consisting of aluminum, titanium, and tin.

9. An interpolymer of a methallyl ester of an ortho inorganic acid of an element of the class consisting of aluminum, titanium, and tin with another polymerizable organic compound containing a methylene ($CH_2$) group attached by an ethylenic double bond to a carbon atom which is in turn attached to at least one negative group of the class consisting of $RCO-$, $RCOO-$, $C_{10}H_7-$, $RO-$, $NC-$, $RNHCO-$, $NH_2CO-$, $(RCO)_2N-$, $RCONH-$, $Cl-$, $CH_2=CH-$, $RCH=CH-$, $CH\equiv C-$, $HOOC-CH=CH-$, and $CH_2=CH-O-$ wherein R is selected from the group consisting of alkyl, aryl, and aralkyl radicals.

10. Process for the production of an ester of a primary alcohol having an unsaturated linkage between the carbon next to the carbinol carbon and the carbon once removed from the carbinol carbon with an ortho inorganic acid of an element of the class consisting of aluminum, titanium, and tin, which comprises reacting said alcohol with an ester of the ortho inorganic acid with a more volatile alcohol.

11. Process for the production of a methallyl ester of an ortho inorganic acid of an element of the class consisting of aluminum, titanium, and tin which comprises reacting the alpha, beta-unsaturated alcohol with an ester of the ortho inorganic acid with a more volatile alcohol.

12. Process for the production of interpolymers which comprises reacting an ester of a primary alcohol having an unsaturated linkage between the carbon next to the carbinol carbon and the carbon once removed from the carbinol carbon with an ortho inorganic acid of an element of the class consisting of aluminum, titanium, and tin with another polymerizable, organic compound containing a methylene ($CH_2$) group attached by an ethylenic double bond to a carbon atom which is in turn attached to at least one negative group of the class consisting of $RCO-$, $RCOO-$, $C_{10}H_7-$, $RO-$, $NC-$, $RNHCO-$, $NH_2CO-$, $(RCO)_2N-$, $RCONH-$, $Cl-$, $CH_2=CH-$, $RCH=CH-$, $CH\equiv C-$, $HOOC-CH=CH-$, and $CH_2=CH-O-$ wherein R is selected from the group consisting of alkyl, aryl, and aralkyl radicals.

13. Process for the production of interpolymers which comprises reacting a methallyl ester of an ortho inorganic acid of an element of the class consisting of aluminum, titanium, and tin with another polymerizable organic compound containing a methylene ($CH_2$) group attached by an ethylenic double bond to a carbon atom which is in turn attached to at least one negative group of the class consisting of $RCO-$, $RCOO-$, $C_{10}H_7-$, $RO-$, $NC-$, $RNHCO-$, $NH_2CO-$, $(RCO)_2N-$, $RCONH-$, $Cl-$, $CH_2=CH-$, $RCH=CH-$, $CH\equiv C-$, $HOOC-CH=CH-$ and $CH_2=CH-O-$ wherein R is selected from the group consisting of alkyl, aryl, and aralkyl radicals.

14. An ester of a primary alcohol having a methylene ($CH_2$) group attached by an ethylenic double bond to the carbon next to the carbinol carbon with an ortho inorganic acid of the class consisting of aluminum, titanium, and tin.

15. A polymer of an ester of a primary alcohol having a methylene ($CH_2$) group attached by an ethylenic double bond to the carbon next to the carbinol carbon with an ortho inorganic acid of the class consisting of aluminum, titanium, and tin.

16. An ester of a primary alcohol having a methylene ($CH_2$) group attached by an ethylenic double bond to the carbon next to the carbinol carbon with an ortho inorganic acid of aluminum.

17. A polymer of an ester of a primary alcohol having a methylene ($CH_2$) group attached by an ethylenic double bond to the carbon next to the carbinol carbon with an ortho inorganic acid of aluminum.

18. An ester of a primary alcohol having a methylene ($CH_2$) group attached by an ethylenic double bond to the carbon next to the carbinol carbon with an ortho inorganic acid of titanium.

19. A polymer of an ester of a primary alcohol having a methylene ($CH_2$) group attached by an ethylenic double bond to the carbon next to the carbinol carbon with an ortho inorganic acid of titanium.

20. An ester of a primary alcohol having a methylene ($CH_2$) group attached by an ethylenic double bond to the carbon next to the carbinol carbon with an ortho inorganic acid of tin.

21. A polymer of an ester of a primary alcohol having a methylene ($CH_2$) group attached by an ethylenic double bond to the carbon next to the carbinol carbon with an ortho inorganic acid of tin.

22. An interpolymer of methallyl aluminate with a polymerizable organic compound containing a methylene ($CH_2$) group attached by an ethylenic double bond to a carbon atom which is in turn attached to at least one negative group of the class consisting of RCO—, RCOO—, $C_{10}H_7$—, RO—, NC—, RNHCO—, $NH_2CO$—, $(RCO)_2N$—, RCONH—, Cl—, $CH_2$=CH—, RCH=CH—, CH≡C, HOOC—CH=CH—, and $CH_2$=CH—O—, wherein R is selected from the group consisting of alkyl, aryl, and aralkyl radicals.

23. An interpolymer of methallyl titanate with a polymerizable organic compound containing a methylene ($CH_2$) group attached by an ethylenic double bond to a carbon atom which is in turn attached to at least one negative group of the class consisting of RCO—, RCOO—, $C_{10}H_7$—, RO—, NC—, RNHCO—, $NH_2CO$—, $(RCO)_2N$—, RCONH—, Cl—, $CH_2$=CH—, RCH=CH—,

CH≡C—, HOOC—CH=CH— and $CH_2$=CH—O—, wherein R is selected from the group consisting of alkyl, aryl, and aralkyl radicals.

24. An interpolymer of methallyl stannate with a polymerizable organic compound containing a methylene ($CH_2$) group attached by an ethylenic double bond to a carbon atom which is in turn attached to at least one negative group of the class consisting of RCO—, RCOO—, $C_{10}H_7$—, RO—, NC—, RNHCO—, $NH_2CO$—, $(RCO)_2N$—, RCONH—, Cl—, $CH_2$=CH—, RCH=CH—,

CH≡C—, HOOC—CH=CH— and $CH_2$=CH—O—, wherein R is selected from the group consisting of alkyl, aryl, and aralkyl radicals.

25. An interpolymer of trimethallyl aluminate and methyl methacrylate.

26. An interpolymer of tetramethallyl stannate and methyl methacrylate.

27. An interpolymer of tetramethallyl titanate and vinyl acetate.

HENRY S. ROTHROCK.

CERTIFICATE OF CORRECTION.

Patent No. 2,258,718.                                                            October 14, 1941.

HENRY S. ROTHROCK.

It is hereby certified that error appears in the printed specification of the above numbered patent requiring correction as follows: Page 1, first column, lines 42, 43 and 44, for "$CH_2\equiv CH-$, $RCH\equiv CH-$, $CH\equiv C-$, $HOOC-CH\equiv CH-$, and $CH_2\equiv CH-O-$," read --$CH_2=CH-$, $RCH=CH-$, $CH\equiv C-$, $HOOC-CH=CH-$, and $CH_2=CH-O-$,--; and second column, line 15, for "$CH_2\equiv C$" read --$CH_2=C$--; and that the said Letters Patent should be read with this correction therein that the same may conform to the record of the case in the Patent Office.

Signed and sealed this 10th day of February, A. D. 1942.

Henry Van Arsdale, (Seal)                                              Acting Commissioner of Patents.